United States Patent [19]

Tanaka et al.

[11] Patent Number: 4,830,394
[45] Date of Patent: May 16, 1989

[54] VEHICLE SUSPENSION APPARATUS

[75] Inventors: Tadao Tanaka; Mitsuhiko Harara, both of Okazaki; Yasutaka Taniguchi, Nagoya; Shozo Takizawa; Minoru Tatemoto, both of Okazaki, all of Japan

[73] Assignee: Mitsubishi Jidosha Kogyo Kabushiki Kaisha, Tokyo, Japan

[21] Appl. No.: 238,394

[22] Filed: Aug. 30, 1988

[30] Foreign Application Priority Data

Sep. 4, 1987 [JP] Japan ................. 62-221244

[51] Int. Cl.$^4$ ............................................. B60G 17/00
[52] U.S. Cl. .................................. 280/689; 280/707; 280/772; 280/112.2
[58] Field of Search ............... 280/112 A, 707, 688, 280/689, 708, 711, 772

[56] References Cited

U.S. PATENT DOCUMENTS

| | | | |
|---|---|---|---|
| 3,608,925 | 9/1971 | Murphy | 280/707 |
| 4,603,881 | 8/1986 | Mikina | 280/689 |
| 4,605,244 | 8/1986 | Tanaka et al. | 280/707 |
| 4,613,154 | 9/1986 | Tanaka et al. | 280/707 |
| 4,624,476 | 11/1986 | Tanaka et al. | 280/707 |
| 4,625,994 | 12/1986 | Tanaka et al. | 280/707 |
| 4,640,526 | 2/1987 | Tanaka et al. | 280/707 |
| 4,669,749 | 6/1987 | Tanaka et al. | 280/707 |
| 4,673,193 | 6/1987 | Kobayashi et al. | 280/707 |
| 4,695,074 | 9/1987 | Kobayashi et al. | 280/707 |
| 4,697,237 | 9/1987 | Tanaka et al. | 314/424.05 |
| 4,730,843 | 3/1988 | Tanaka et al. | 280/689 |
| 4,753,328 | 6/1988 | Williams et al. | 280/707 |
| 4,761,022 | 8/1988 | Ohashi et al. | 280/707 |

FOREIGN PATENT DOCUMENTS 0236947  3/1987 European Pat. Off.
0249248  6/1987 European Pat. Off.
61-263815 11/1961 Japan.
61-263814 11/1961 Japan.
2025863  5/1979 United Kingdom.

Primary Examiner—Richard A. Bertsch
Attorney, Agent, or Firm—Hedman, Gibson, Costigan & Hoare

[57] ABSTRACT

A vehicle suspension apparatus having a fluid spring chamber provided for each wheel and inserted between the wheel and a vehicle body, a fluid supply unit for supplying a fluid to each fluid spring chamber through a supply valve, a fluid exhaust unit for exhausting the fluid from each fluid spring chamber through an exhaust valve, a roll amount detector for detecting a roll amount of the vehicle body, and a roll controller for setting a control target corresponding to the roll amount detected by the roll amount detector and executing roll control in which the supply valves corresponding to the fluid spring chambers at a contracting side with respect to a direction of roll generated in the vehicle body and the exhaust valves corresponding to the fluid spring chambers at an expanding side are opened in accordance with the control target, includes a plurality of memories, provided in the roll controller, each for storing a control target corresponding to the roll amount of the vehicle body, the control targets stored in the memories being different from each other, and a selection switch for outputting a selection signal for selecting one of a plurality of memories in the roll controller to the roll controller, wherein the roll controller calculates a control target in accordance with one of the memories selected by the selection switch on the basis of the roll amount detected by the roll amount detector and executes the roll control on the basis of the obtained control target.

5 Claims, 17 Drawing Sheets

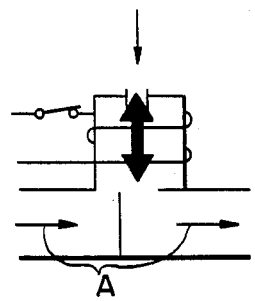
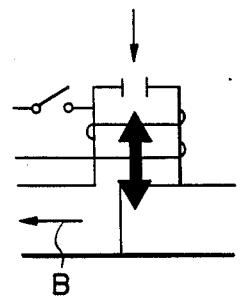
FIG. 2A  FIG. 2B
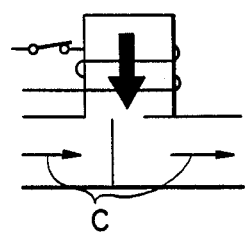
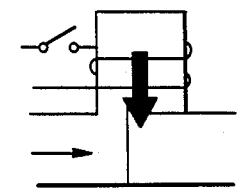
FIG. 3A  FIG. 3B
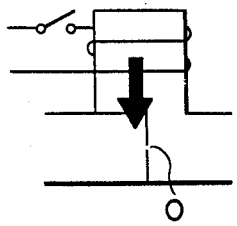
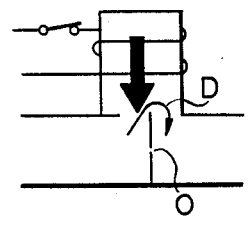
FIG. 4A  FIG. 4B

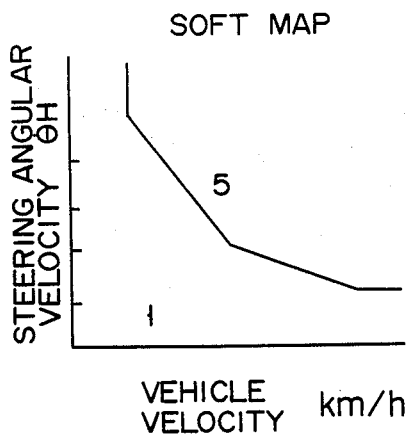
F I G. 5
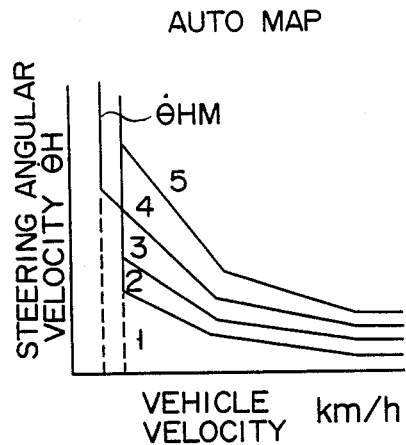
F I G. 6
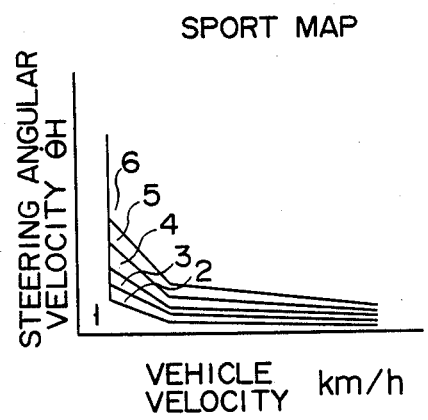
F I G. 7
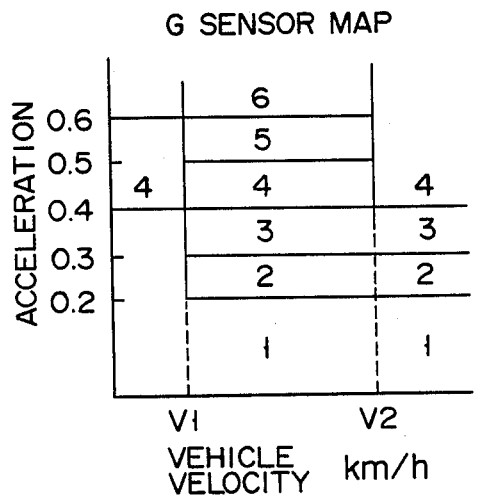
F I G. 8

FIG. 9

| ROLL CONTROL MODE / CONTROL LEVEL TCH | SOFT MODE | | AUTO MODE | | SPORT MODE | |
|---|---|---|---|---|---|---|
| | TCS, TCE | DAMPING FORCE | TCS, TCE | DAMPING FORCE | TCS, TCE | DAMPING FORCE |
| 1 | NON SENSITIVE AREA | SOFT | NON SENSITIVE AREA | SOFT | NON SENSITIVE AREA | SOFT |
| 2 | ← | ← | DISCOMMUNI-CATION | MEDIUM | 200 msec | ← |
| 3 | ← | ← | 150 msec | ← | 300 msec | ← |
| 4 | ← | ← | 200 msec | HARD | 400 msec | ← |
| 5 | 200 msec | HARD | 300 msec | HARD | 500 msec | ← |
| 6 FRONT | | | | | 500 msec | ← |
| 6 REAR | | | | | 650 msec | ← |

| CONTROL LEVEL TCH \ ROLL CONTROL MODE | AUTO (V<130km/h) | | AUTO (V≧130km/h) | | SPORT | |
|---|---|---|---|---|---|---|
| | TCS, TCE | DAMPING FORCE | TCS, TCE | DAMPING FORCE | TCS, TCE | DAMPING FORCE |
| 1 | NON SENSITIVE AREA | SOFT | NON SENSITIVE AREA | MEDIUM | NON SENSITIVE AREA | HARD |
| 2 | ↑ | ↑ | 100 msec | ↑ | 150 msec | ↑ |
| 3 | ↑ | ↑ | 250 msec | ↑ | 300 msec | ↑ |
| 4 | DISCOMMUNICATION | MEDIUM | 450 msec | HARD | 500 msec | ↑ |
| 5 | 150 msec | ↑ | | | | |
| 6 | 350 msec | HARD | | | | |

F I G. 10

| $T_{CG}$ | NORMAL INLET/OUTLET TIME | ROUGH ROAD INLET/OUTLET TIME |
|---|---|---|
| 4 | 500 msec | 500 msec |
| 3 | 300 msec | 300 msec |
| 2 | 150 msec | O (↓) |
| 1 | O (↓) <br> O (NON SENSITIVE AREA) | O (↓) <br> O (NON SENSITIVE AREA) |

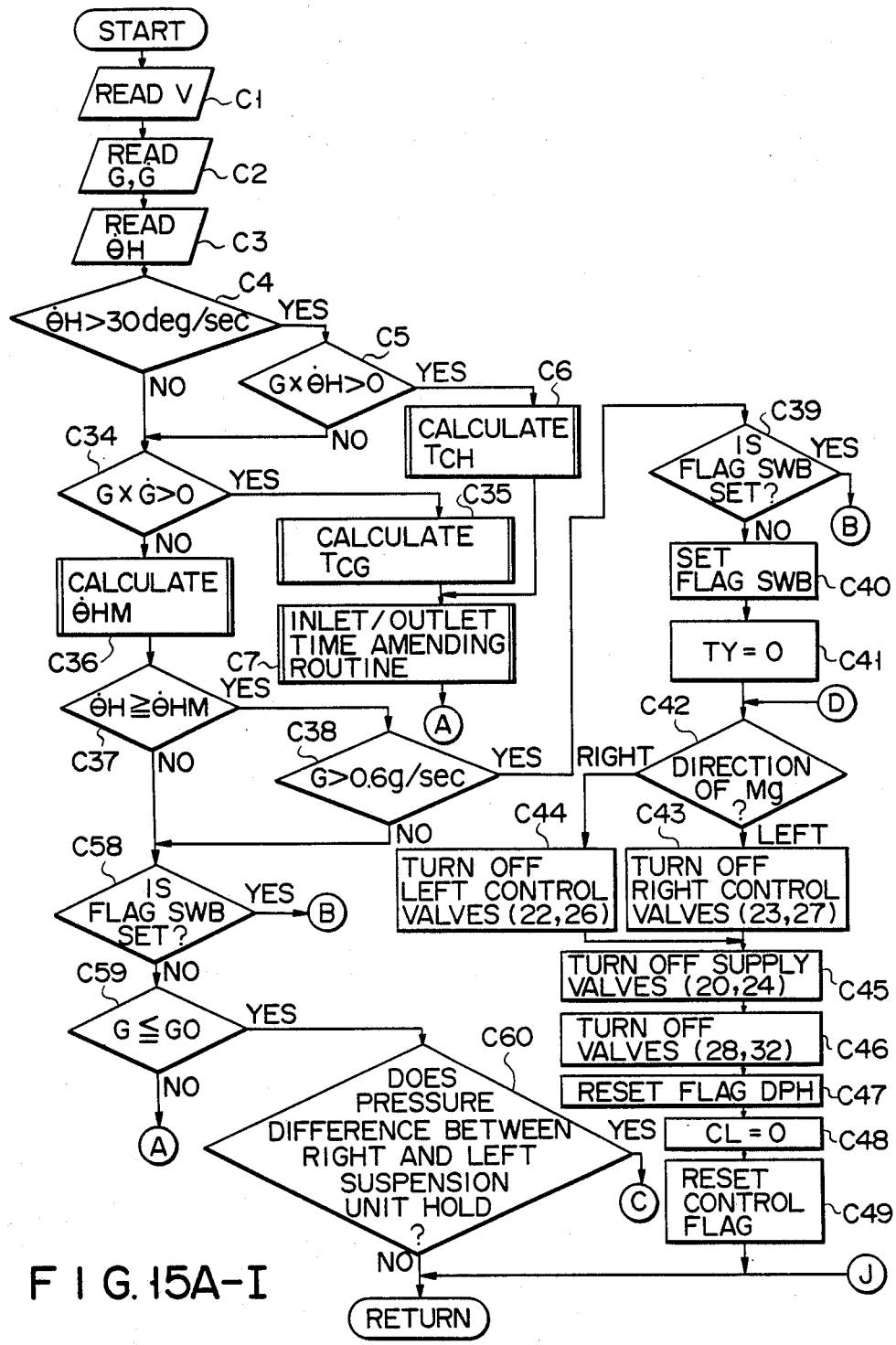
FIG. 15A-I

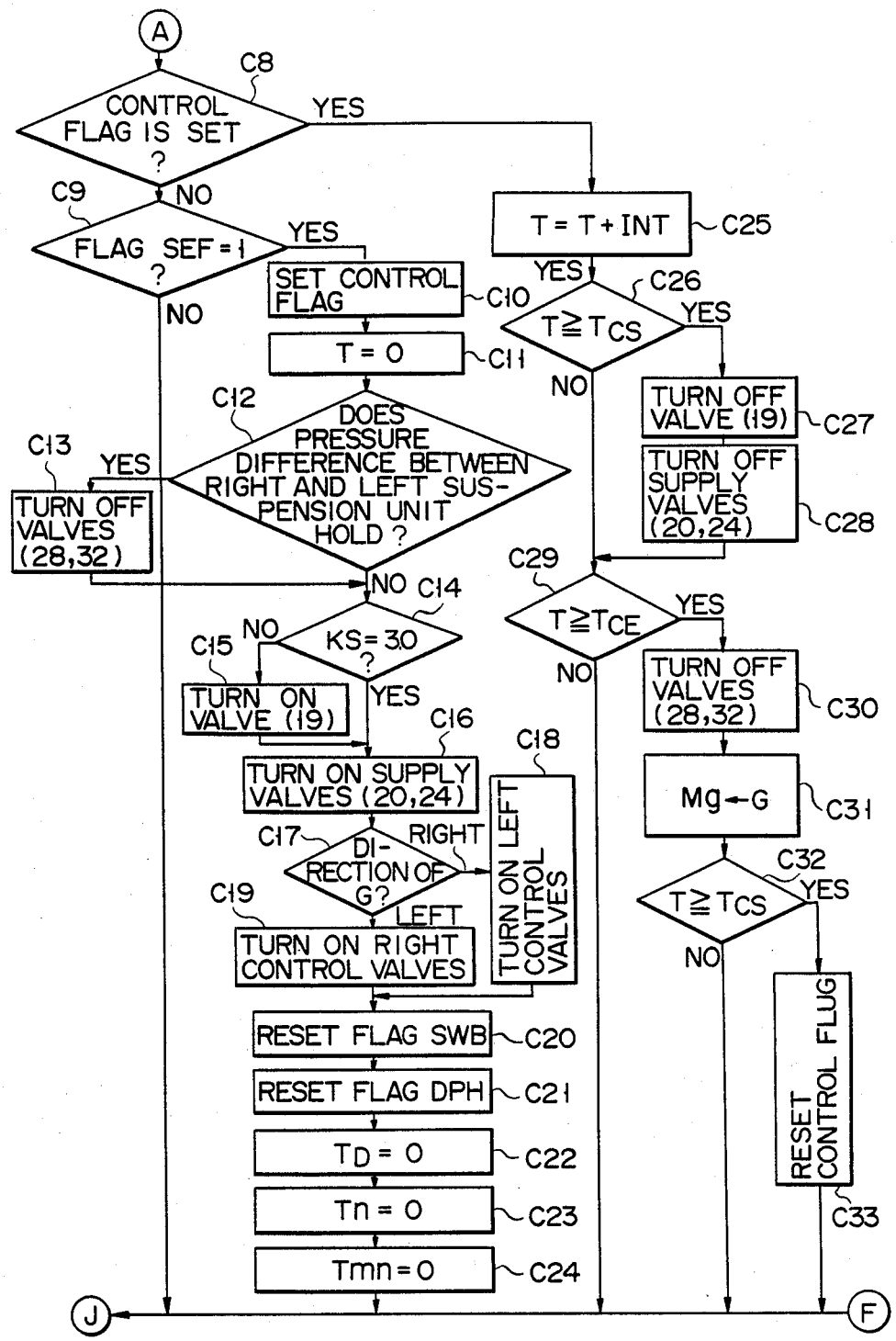
FIG. 15A-II

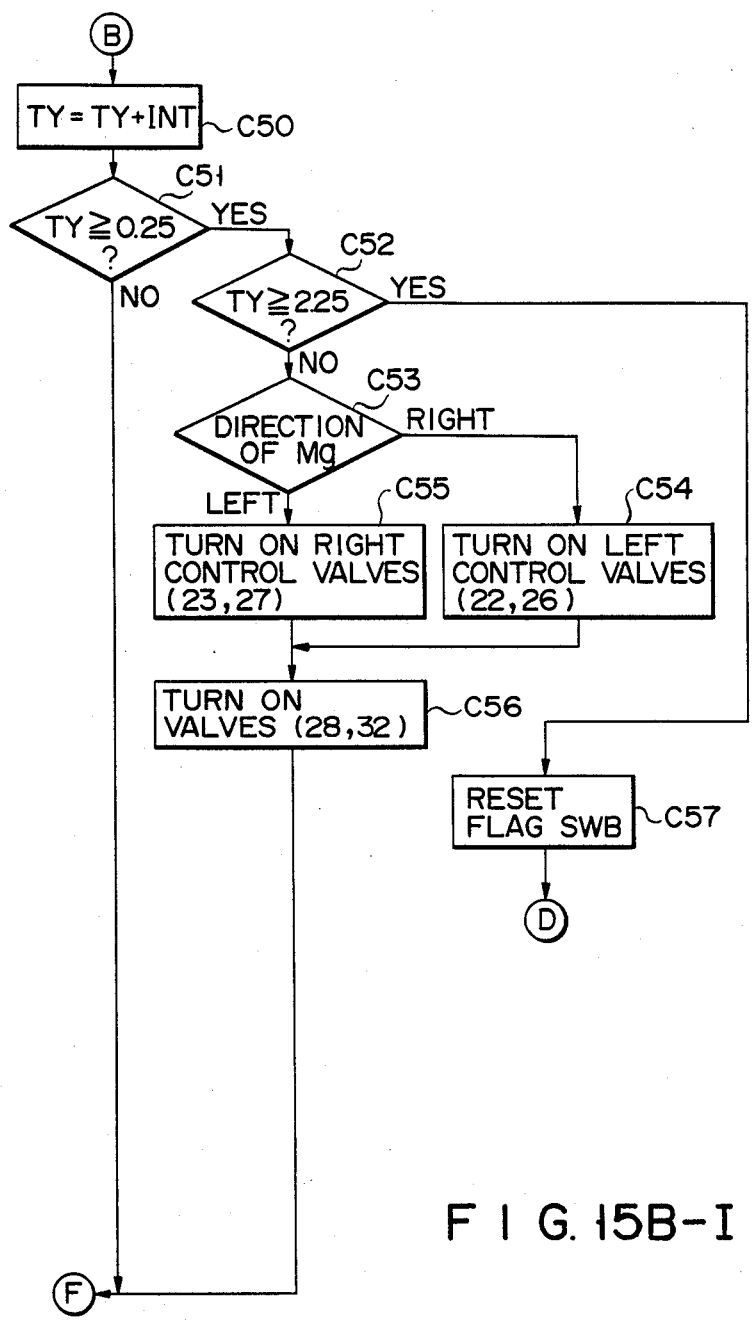
FIG. 15B-I

FIG. 15B-II
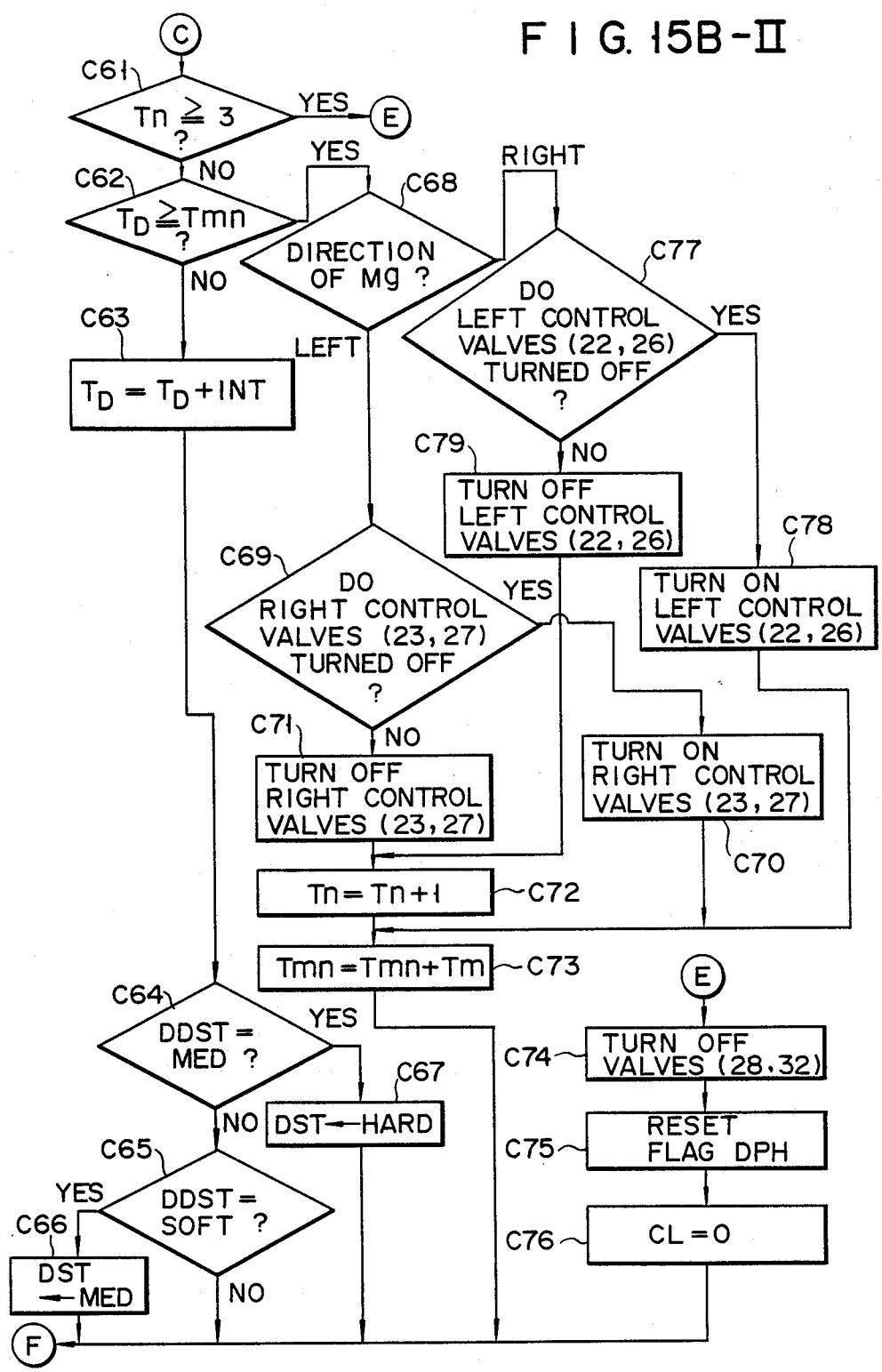

VEHICLE SUSPENSION APPARATUS

BACKGROUND OF THE INVENTION

1. Field of the Invention

The present invention relates to a vehicle suspension apparatus for reducing a roll generated in a vehicle body when the vehicle turns.

2. Description of the Related Art

U.S. Pat. Nos. 3,608,925, 4,624,476, and 4,730,843, for example, disclose a conventional vehicle suspension apparatus comprising a fluid spring chamber formed for each suspension unit for supporting a wheel, a fluid means for supplying a fluid to the fluid spring chambers through supply valve means, a fluid exhaust means for exhausting the fluid from the fluid spring chambers through exhaust valve means, a roll amount detecting means for detecting a roll amount of a vehicle body, and a roll control means for calculating a control target according to the roll amount detected by the roll amount detecting means and executing roll control in which the supply valve means corresponding to the fluid spring chambers at a contracting side with respect to a roll direction of a vehicle body and the exhaust valve means corresponding to the fluid spring chambers at an expanding side are opened on the basis of the control target.

In this suspension apparatus, a control amount is determined in accordance with the roll amount detected by the roll amount detecting means. However, in a certain turning state of a vehicle, some drivers prefer a larger control amount with respect to a roll of the vehicle, and other drivers prefer a smaller one.

In the above conventional apparatus, however, since the control amount of the roll control executed in a certain turning state is constant, roll control corresponding to driver's taste cannot be performed.

– SUMMARY OF THE INVENTION

The present invention has been made in consideration of the above situation and has as its object to provide a vehicle suspension apparatus in which a control mode can be selected in accordance with a driver's taste during roll control.

For this purpose, in accordance with the present invention, there is provided a vehicle suspension apparatus having a fluid spring chamber provided for each suspension unit for supporting a wheel, fluid supply means for supplying a fluid to the fluid spring chamber through supply valve means, fluid exhaust means for exhausting the fluid from the fluid spring chamber through exhaust valve means, roll amount detecting means for detecting a roll amount of the vehicle body, and roll control means for calculating a control target corresponding to the roll amount detected by the roll amount detecting means and executing roll control in which the supply valve means corresponding to the fluid spring chambers at a contracting side with respect to a direction of roll generated in the vehicle body and the exhaust valve means corresponding to the fluid spring chambers at an expanding side are opened in accordance with the control target, comprising: a plurality of memory means, provided in the roll control means, each for storing a control target corresponding to the roll amount of the vehicle body, the control targets stored in the plurality of memory means being different from each other; and selection switch means for outputting a selection signal for selecting one of the plurality of memory means in the roll control means to the roll control means, wherein the roll control means calculates a control target in accordance with one of the memory means selected by the selection switch means on the basis of the roll amount detected by the roll amount detecting means and executes the roll control on the basis of the obtained control target.

According to the present invention, a control target is calculated in accordance with the memory means selected by a driver using the selection switch means, and roll control is performed on the basis of the control target. Therefore, roll control can be performed by a control amount corresponding to a driver's taste.

BRIEF DESCRIPTION OF THE DRAWINGS

FIGS. 2A and 2B are views showing driven and nondriven states of a three-way valve, respectively;

FIGS. 3A and 3B are views showing driven and nondriven states of a solenoid valve, respectively;

FIGS. 4A and 4B are views showing nondriven and driven states of a supply flow amount control valve, respectively;

FIG. 5 is a vehicle velocity - steering angular velocity map in a SOFT mode;

FIG. 6 is a vehicle velocity - steering angular velocity map in an AUTO mode;

FIG. 7 is a vehicle velocity - steering angular velocity map in a SPORT mode;

FIG. 8 is a G sensor map;

FIG. 9 is a table showing a relationship between a control level and an inlet/outlet time according to the vehicle velocity - steering angular velocity map;

FIG. 10 is a table showing a relationship between the control level and the inlet/outlet time according to the G sensor map;

FIGS. 15A-I, 15A-II, 15B-I, and 15B-II are detailed flow charts for explaining a roll control routine;

DETAILED DESCRIPTION OF THE PREFERRED EMBODIMENTS

Figure 1:
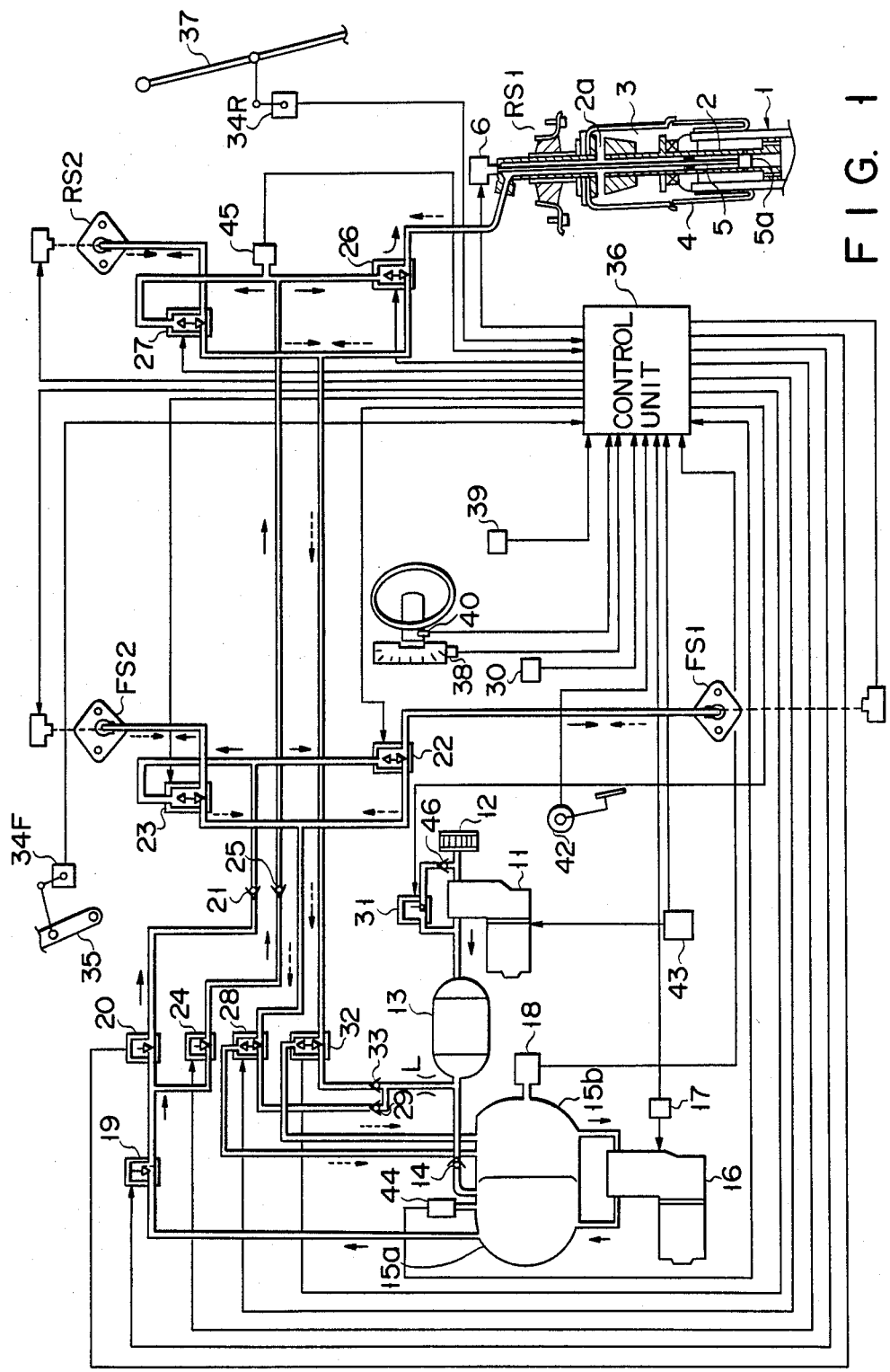
FIG. 1 is a view showing a vehicle suspension apparatus according to an embodiment of the present invention.

An embodiment of the present invention will be described below with reference to the accompanying drawings. In FIG. 1, reference symbol FS1 denotes a suspension unit at the front left wheel side; FS2, a suspension unit at the front right wheel side; RS1, a suspension unit at the rear left wheel side; and RS2, a suspension unit at the rear right wheel side. Since suspension units FS1, FS2, RS1, and RS2 are nearly the same structure, the suspension unit will be represented by symbol S hereinafter except that front and rear wheels or left and right wheels are independently explained.

Suspension unit S includes shock absorber 1. Absorber 1 includes a cylinder mounted on a wheel and piston rod 2 having a piston slidably inserted in the cylinder and supported on a vehicle body at its upper end. Unit S includes air spring chamber 3 formed above absorber 1 and coaxially with rod 2 and having a vehicle height adjusting function. Part of chamber 3 is formed by bellows 4. Therefore, by supplying/exhausting air to/from chamber 3 through path 2a formed in rod 2, the height can be increased/decreased.

Control rod 5 having valve 5a, for adjusting a force at its lower end is located in piston rod 2. Control rod 5 is rotated by actuator 6 mounted on the upper end of piston rod 2 to drive valve 5a. The damping force of the suspension unit is set by a rotating motion of valve 5a at three levels of HARD, MEDIUM, and SOFT.

Compressor 11 compresses air fed from air cleaner 12 and supplies the air to high-pressure reserve tank 15a through dryer 13 and check valve 14. That is, since compressor 11 compresses air fed from cleaner 12 and supplies the air to dryer 13, the compressed air dried by silica gel or the like in dryer 13 is received in tank 15a. An inlet port of compressor (return pomp) connected to low-pressure reserve tank 15b, and its outlet port is connected to high-pressure reserve tank 15a. Reference numeral 18 denotes a pressure switch which is turned on when the pressure in tank 15b exceeds a first set value (e.g., the atmospheric pressure). When switch 18 outputs an ON signal, compressor 16 is driven by compressor relay 17 which is turned on by a signal from control unit 36 (to be described later). Therefore, the pressure in tank 15b is always maintained below the first set value.

Air is supplied from tank 15a to each suspension unit S as indicated by solid arrows in FIG. 1. That is, the compressed air in tank 15a is supplied to suspension units FS1 and FS2 through supply flow amount control valve 19, front supply solenoid valve 20, check valve 21, front left solenoid valve 22, and front right solenoid valve 23. Similarly, the compressed air in tank 15a is supplied to suspension units RS1 and RS2 through control valve 19, rear supply solenoid valve 24, check valve 25, rear left solenoid valve 26, and rear right solenoid valve 27.

Air is exhausted from each unit S as indicated by broken arrows in FIG. 1. That is, the compressed air in units FS1 and FS2 is supplied to tank 15b through solenoid valves 22 and 23, and exhaust direction change valve 28 comprising a three-way valve or is exhausted in atmosphere through solenoid valves 22 and 23, change valve 28, check valve 29, dryer 13, exhaust solenoid valve 31, check valve 46, and air cleaner 12. Similarly, the compressed air in units RS1 and RS2 is supplied to tank 15b through solenoid valves 26 and 27 and exhaust direction change valve 32 or is exhausted in the atmosphere through solenoid valves 26 and 27, change valve 32, check valve 33, dryer 13, solenoid valve 31, check valve 46, and air cleaner 12. Note that a path having throttle L which is smaller than a diameter of paths connecting change valves 28 and 32 with tank 15b is inserted between check valves 29 and 33 and dryer 13.

Each of solenoid valves 22, 23, 26, 27, 28, and 32 allows an air flow as indicated by arrows A in FIG. 2A when it is ON (energized) and allows an air flow as indicated by arrows B in FIG. 2B when it is OFF (deenergized). Each of valves 20, 24, and 31 allows an air flow as indicated by arrows C in FIG. 3A when it is ON (energized) and inhibits an air flow as shown in FIG. 3B when it is OFF (deenergized). When valve 19 is OFF (deenergized), an air flow amount is reduced because the air flows through orifice o as shown in FIG. 4A. When valve 19 is ON (energized), an air flow amount is increased because the air flows through orifice o and large-diameter path D as shown in FIG. 4B.

Reference numeral 34F denotes a front vehicle height sensor, mounted between lower arm 35 of the front right suspension of the vehicle and the vehicle body, for detecting a front vehicle height; and 34R, a rear vehicle height sensor, mounted between lateral rod 37 of the rear left suspension of the vehicle and the vehicle body, for detecting a rear vehicle height. Signals detected by sensors 34F and 34R are supplied to control unit 36 comprising an input circuit, an output circuit, a memory, and a microcomputer.

Reference numeral 38 denotes a vehicle velocity sensor, incorporated in a speedometer, for supplying a detected vehicle velocity signal to unit 36; 39, an acceleration sensor for detecting an acceleration acting on a vehicle body and supplying a detected acceleration signal to unit 36; 30, a roll control mode selection switch for selecting SOFT, AUTO, or SPORT of a roll control mode; 40, a steering wheel sensor for detecting a rotational speed of steering wheel 41, i.e., a steering angular velocity; and 42, an accelerator opening sensor for detecting a step-on angle of an accelerator pedal. Signals from switch 30 and sensors 40 and 42 are supplied to control unit 36. Reference numeral 43 denotes a compressor relay, controlled by a control signal from control unit 36, for driving compressor 11; and 44, a pressure switch which is turned on when the pressure in high-pressure reserve tank 15a is reduced below a second set value (e.g., 7 kg/cm$^2$). A signal from switch 44 is supplied to unit 36. When the pressure in tank 15a is reduced below the second set value and pressure switch 18 is turned on, i.e., compressor 16 is driven although pressure switch 44 is turned on, unit 36 inhibits driving of compressor 11. Reference numeral 45 denotes a pressure sensor, located in a path connecting solenoid valves 26 and 27, for detecting internal pressures in suspension units RS1 and RS2.

Each of solenoid valves 19, 20, 22, 23, 24, 26, 27, 28, 31, and 32 is controlled in accordance with a control signal from control unit 36.

Figure 11:
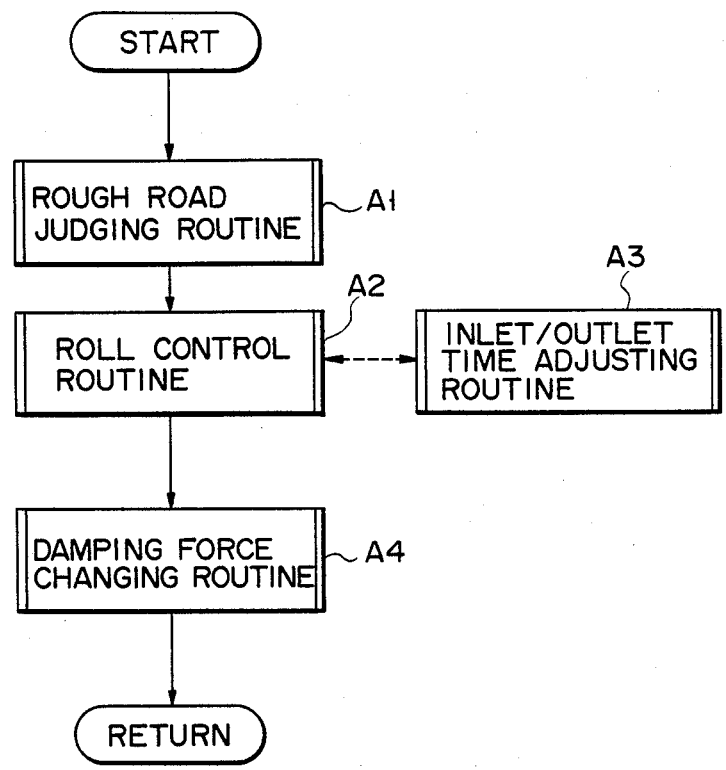
FIG. 11 is a schematic flow chart for explaining an operation of the embodiment of the present invention.

An operation of the embodiment of the present invention having the above arrangement will be described below. FIG. 11 is a flow chart for schematically explaining a roll control sequence executed by control unit 36. First, in a rough road judging routine (step A1) as a rough road judging means, so-called rough road judging processing is performed. That is, in the rough road judging routine, when an output change of front vehicle height sensor 34F is 1 MHz or more (N times or more in two seconds), a rough road judgement is set, and a non sensitive area of G sensor 39 at this time is widened to reduce an erroneous operation of roll control. Then, in a roll control routine (step A2) as a roll control means, roll control is performed, i.e., air is supplied to suspension units at a contracting side and is exhausted from suspension units at an expanding side, thereby preventing a roll of a vehicle body when the vehicle turns. In this roll control, an inlet/outlet time is adjusted in an inlet/outlet time adjusting routine (step A3) as an inlet/outlet time adjusting means, and an inlet/outlet time of each wheel is adjusted and calculated. In a damping force changing routine (step A4) as a damping force changing means, a damping force of each suspension unit is set to be an optimum one of HARD, MEDIUM, and SOFT. Processing of steps A1 to A4 will be described in detail below.

Figure 12:
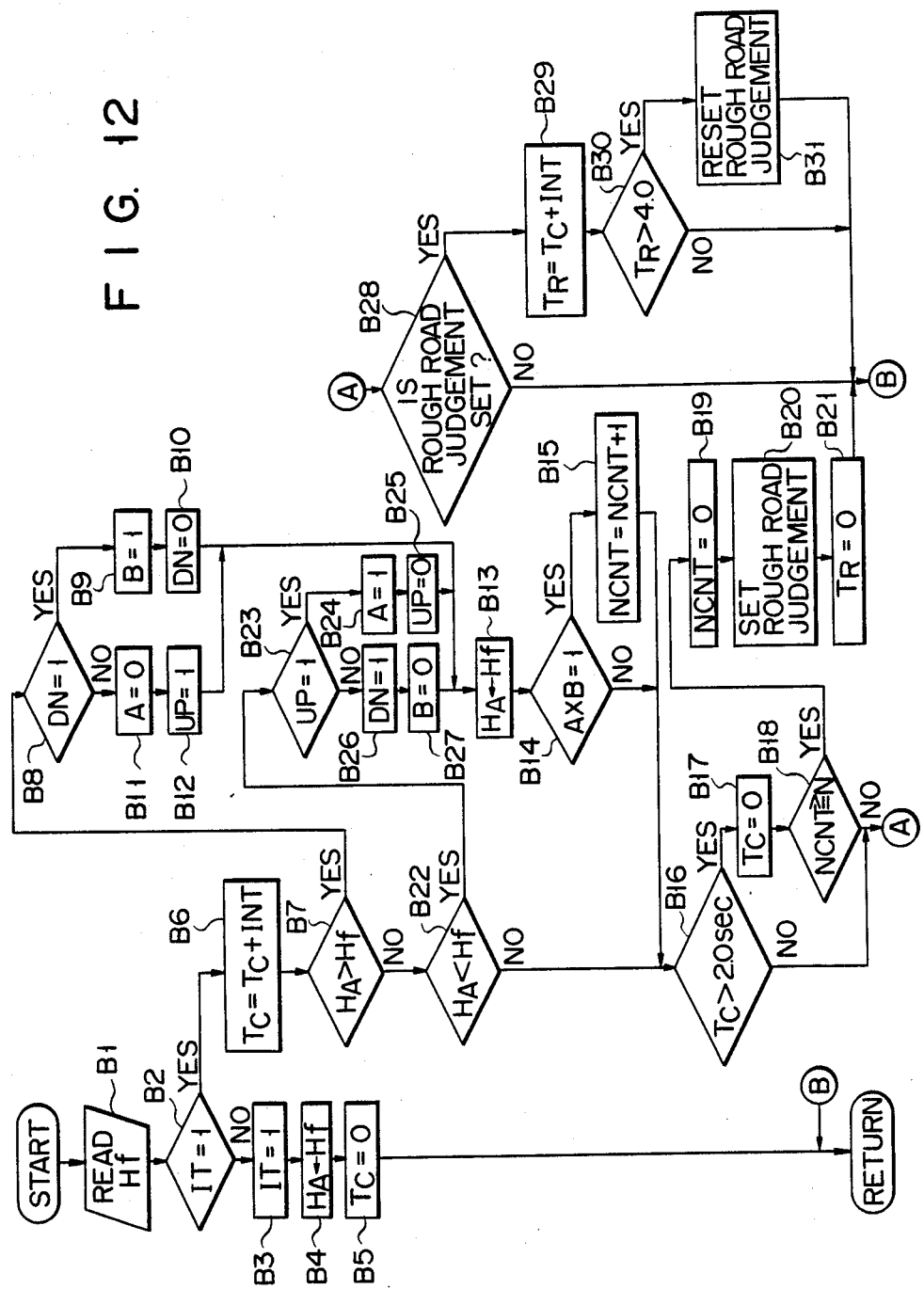
FIG. 12 is a detailed flow chart for explaining a rough road judging routine.

First, an operation of the rough road judging routine (step A1) will be described in detail with reference to FIG. 12. Front vehicle height Hf detected by front vehicle height sensor 34F is read by control unit 36 at each predetermined timing (step B1). In this case, assume that "0"s are set in flags IT, A, B, UP, and DN (to be described later) in the main routine shown in FIG. 11. "1" is set in flag IT when the rough road judgement is started, "1" is set in flag A during a time interval from a timing at which height Hf is increased from a reduced state to a timing from which height Hf is reduced again, "1" is set in flag B during a time interval from a timing at which height Hf is reduced from an increased state to a timing from which height Hf is increased again, "1" is set in flag UP when height Hf maintains a reducing state, and "1" is set in flag DN when height Hf maintains an increasing state.

First, "NO" is judged in a first judgement in step B2 because flag IT is "0". After "1" is set in flag IT, current front vehicle height Hf is stored in register HA, and timer Tc is reset (steps B3 to B5).

Figures 13, 14:
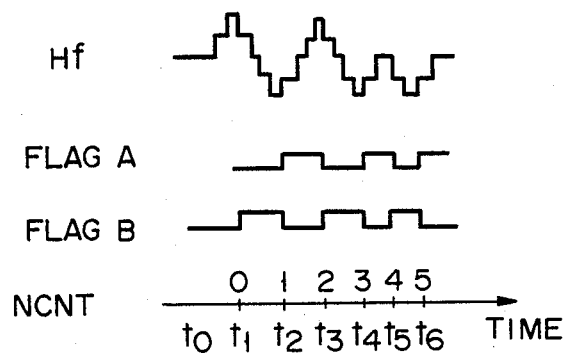
FIG. 13 shows the G sensor map in normal and rough road states.
FIG. 14 is a view showing a change in state in accordance with an output change of a vehicle height sensor.

When height Hf is read by control unit 36 next time, "YES" is judged in step B2, and timer Tc is incremented by interval time INT (step B6). Control unit 36 judges whether height Hf is smaller than stored vehicle height HA (step B7) or larger than that (step B22), and processing (to be described later) is performed in accordance with the judgement. For example, when front vehicle height signal Hf is input from timing t0 as shown in FIG. 14, height Hf is being increased. Therefore, "HA<Hf" is judged in step B22, and the flow advances to processing in step B23. Since "0" is set in flag UP in initialization, height Hf is stored in HA (step B13) after "1" and "0" are set in flags DN and B, respectively (steps B26 and B27). Then, whether "A×B=1", i.e., "A=B=1" is judged (step B14). "A×B=1" is judged when an increasing/decreasing tendency of height Hf is reversed. In this case, since "A=B=0", "NO" is judged in step B14. Then, the flow advances to step B16, and whether timer Tc has counted two seconds or more is judged. At this time, since two seconds have not passed, the flow advances to a judgement in step B28. In step B28, whether a rough road judgement is set is judged. In this case, since the rough road judgement is not set, the flow returns.

Thereafter, since height Hf is reduced from timing t1, "YES" is judged in step B7, and the flow advances to a judgement in step B8. In step B8, whether "flag DN=1" is set is judged. Since flag DN is set in step B26, "YES" is determined, and "flag B=1" and "flag DN=0" are set (steps B9 and B10). Thereafter, similar to the flow at timing t0, the flow returns through steps B13, B14, B16, and B28. Then, as shown in FIG. 14, height Hf is continuously reduced. When "YES" is judged in step B7 and the flow advances to the judgement in step B8, flag A=0 and flag UP=1 are set (steps B11 and B12) as shown in FIG. 14 because flag DN=0 is set.

Thereafter, when height Hf starts increasing from timing t2 of FIG. 14, "YES" is judged in step B22, and the flow advances to judgement in step B23. Since flag UP is already set, flag A=1 and flag UP=0 are set (steps B24 and B25).

In this manner, when height Hf is increased/decreased as shown in FIG. 14, flag B is set at "1" for a time interval from a timing at which height Hf is decreased from an increased state to a timing from which height Hf is increased again, and flag A is set at "1" for a time interval from a timing at which height Hf is increased from a reduced state to a timing from which height Hf is reduced.

The flow advances to step B14 through step B13. In this case, "A×B=1" is set because "A=1" and "B=1" are set, and the flow advances to step B15. Note that "1"s are set in both flags A and B only when an increasing/decreasing tendency of height Hf is reversed as described above, and "A×B=1" is set each time the tendency is reversed. Therefore, in step B15, counter NCNT is incremented by "+1". That is, counter NCNT is incremented by "+1" by each time the tendency is reversed. The above processing is repeated until the count of timer Tc exceeds two seconds. When the count of timer Tc exceeds two seconds, timer Tc is reset, and whether the count of NCNT is N or more is judged (steps B16 to B18). That is, when it is detected that the increasing/decreasing tendency of height Hf is reversed N times or more in two seconds, a rough road is judged, NCNT=0 and a rough road judgement are set, delay timer TR=0 is set (steps B19 to B21), and then the flow returns.

When "NO" is judged in step B16 or B18 and the rough road judgement is set, delay timer TR is incremented by time INT. When delay timer TR exceeds four seconds, the rough road judgement is reset (steps B29 to B31). In this manner, the rough road judgement is reset four seconds after the last rough road judgement is set, i.e., two seconds after "NO" is judged in step B18.

As described above, in rough road judging routine A1, each time the increasing/decreasing tendency of height Hf is reversed, counter NCNT is incremented by "+1" in step B15. When the count of counter NCNT is N or more in two seconds, the rough road judgement representing a rough road is set (step B20). The rough road judgement is reset (step B31) two seconds after "NO" is judged (i.e., a rough road is not judged) in step B18.

An operation of the roll control routine (step A2) will be described in detail with reference to the flow chart shown in FIGS. 15A-I to 15B-II. First, vehicle velocity V detected by vehicle velocity sensor 38, acceleration G in a left-and-right direction and its differential value Ġ output from G sensor 39, and steering angular velocity $\dot{\theta}H$ are read by control unit 36 (steps C1 to C3). Then, unit 36 judges whether steering angular velocity $\dot{\theta}H$ is larger than 30 deg/sec (step C4). That is, whether a steering wheel is operated is judged.

If "YES" is judged in step C4, whether "G×$\dot{\theta}H$" is positive is judged (step C5). That is, whether velocity $\dot{\theta}H$ is in the same direction as acceleration G in the left-and-right direction is judged. If "positive" is judged, the steering wheel is rotated in a steering direction. If "negative" is judged, the steering wheel is rotated in a returning direction. If "YES" is judged in step C5, any of V−$\dot{\theta}H$ maps shown in FIGS. 5 to 7 selected in accordance with a user's taste is referred, and control level TCH corresponding to the vehicle velocity and the steering angular velocity is calculated (step C6). In step C6, the map in FIG. 5 is selected when a SOFT mode is selected as the roll control mode by roll control selection switch 30, the map in FIG. 6 is selected when an AUTO mode is selected, and the map in FIG. 7 is selected when a SPORT mode is selected. Then, an inlet/outlet time and a damping force as shown in FIG. 9 are selected in correspondence to control level TCH of each map. Note that relationships between steering wheel angular velocity $\dot{\theta}$H, vehicle velocity V, a control level, a mode, an inlet/outlet time, and a damping force shown in FIGS. 5 to 7 and 9 are stored in a memory in control unit 36. Inlet/outlet times TCS and TCE of each of front and rear wheels are adjusted and calculated in accordance with an inlet/outlet time adjusting routine to be described in detail with reference to FIG. 16 (step C7). Then, whether a control flag is set is judged (step C8). Since roll control is not started, "NO" is judged in step C8, and the flow advances to step C9. In step C9, whether inlet/outlet flag SEF is set is judged. When inlet/outlet flag SEF is set in the inlet/-outlet adjusting routine (step C7), the control flag is set and inlet/outlet timer T=0 is set (steps C10 and C11). Then, the flow advances to step C12, and whether a pressure difference is held, i.e., whether a pressure difference hold flag to be described later is set is judged. If the pressure difference is held, front and rear exhaust direction change valves 28 and 32 are turned off so that air exhausted from the front or rear is supplied to low-pressure reserve tank 15b. That is, change valves 28 and 32 are turned on while the pressure difference is held. Therefore, in order to perform additional supply/exhaust control, valves 28 and 32 must be turned off.

Then, in the inlet/outlet time adjusting routine in step C7, whether supply coefficient KS=3 is set is judged (step C14). If "NO" (i.e., KS=1) in step C14, supply flow amount control valve 19 is turned on to open large-diameter path D (FIG. 4), thereby increasing a supply flow amount (step S15). That is, as shown in FIG. 16, KS=1 means that control level TCH is calculated in accordance with the vehicle velocity - steering angular velocity. Therefore, in order to perform quick roll control, an air flow amount must be increased.

Then, front and rear supply valves 20 and 24 are turned on (step C16). Control unit 36 judges the direction of acceleration G in the left-and-right direction (step C17). That is, whether the direction of acceleration G in the left-and-right direction is positive or negative is judged. If acceleration G is positive, acceleration G is judged to be at the right side along a travel direction, i.e., a left turn is judged. Meanwhile, if acceleration G is negative, acceleration G is judged to be at the left side along the travel direction, i.e., a right turn is judged. Therefore, when acceleration G is judged to be right (left turn), front and rear left solenoid valves 22 and 26 are turned on (step C18). As a result, air in air spring chambers 3 in the suspension units at the left side is exhausted to low-pressure reserve tank 15b through ON state valve 22 and 26. At the same time, air is supplied from high-pressure reserve tank 15a to air spring chambers 3 of the suspension units at the right side through ON state supply valves 22 and 24 and OFF state valves 23 and 27.

When acceleration G is judged to be left (right turn), front and rear right solenoid valves 23 and 27 are turned on (step C19). As a result, air in chambers 3 of the right suspension units is exhausted to tank 15b through ON valves 23 and 27. At the same time, air is supplied from tank 15a to chambers 3 of the left suspension units through ON valves 20 and 24 and OFF valves 22 and 26.

Then, a swingback flag is reset, the above-mentioned pressure difference hold flag is set, and duty timer TD, duty counter Tn, and duty timer Tmn are set to be "0" (steps C20 to C24). Thereafter, the flow returns to the processing in step C1. Then, the flow advances to the processing in step C8 through processing in steps C1 to C7. At this time, since the control flag is set, "YES" is judged in step C8, and the flow advances to step C25. In step C25, interval time INT is added to update timer T. Then, until the count of timer T becomes inlet time TCS or more or outlet time TCE or more, roll control is continuously performed in which air is supplied to/exhausted from the air spring chambers of the left and right suspension units in accordance with the direction of acceleration G in the left-and-right direction. When the count of timer T becomes inlet time TCS or more, "YES" is determined in step C26. Therefore, flow amount control valve 19 is turned off, and supply solenoid valves 20 and 24 are turned off, thereby stopping an air supply operation (steps C27 and C28). As a result, chambers 3 at the air-supplied side are held in a high-pressure state in which air is supplied for inlet time TCS. When the count of timer T becomes outlet time TCE or more, "YES" is judged in step C29, and exhaust direction change valves 28 and 32 are turned on, thereby stopping an exhaust operation (step C30). As a result, chambers 3 at the exhausted side are held in a low-pressure state in which are is exhausted for outlet time TCE. Then, the direction of acceleration G in the left-and-right direction is stored in memory Mg. If "timer T≧TCS", the control flag is reset to stop roll control, and this state is held (steps C32 and C33). In this manner, a roll generated in a vehicle body when a vehicle turns is suppressed. The above processing is performed when the steering wheel is abruptly operated. However, even if "$\dot{\theta}$H≦30 deg/sec", the G sensor map in FIG. 8 is referred to calculate control level TCG when "G×$\dot{G}$" is positive (step C34). Thereafter, processing similar to that for calculating TCH is performed to perform roll control. In FIG. 8, V1 is set at 30 km/h, and V2 is set at 130 km/h. An inlet/outlet time and a damping force corresponding to control level TCG are calculated from FIG. 10. Relationships between acceleration G in the left-and-right direction, vehicle velocity V, a control level, a mode, an inlet/outlet time, and a damping force shown in FIGS. 8 and 10 are stored in the memory of control unit 36. As is apparent from FIGS. 8 and 10, an inlet/outlet time finally obtained from the G sensor map differs in accordance with a mode selected by control switch 30. Note that the SOFT mode is not described in FIG. 10. This is because a control level is always zero in the G sensor map when the SOFT mode is selected.

In the apparatus of the present invention, an inlet/-outlet time at the front side is set to be different from that at the rear side as will be described in detail with reference to an inlet/outlet time adjusting routine in step C7. Therefore, counting of an inlet/outlet time and inlet/outlet control based on the count are independently performed for the front and rear sides.

When "G×$\dot{G}$" is negative, i.e., when the steering wheel is at a returning side, the map in FIG. 6 is referred, and the vehicle velocity - steering angular velocity map at the returning side is referred (step C36). Threshold value $\dot{\theta}HM$ is calculated, and whether returning-side steering wheel angular velocity $\dot{\theta}H \leq \dot{\theta}HM$ is judged (step C37). If "YES" is judged in step C37, whether change over time $\dot{G}$ of acceleration G in the left-and-right direction is 0.6 g/sec or more is judged (step C38). If "YES" is judged in steps C37 and C38, i.e., if the steering wheel is abruptly returned to its central position and change over time $\dot{G}$ in acceleration G is large when the vehicle returns from turning to straight travel, the vehicle body rolls to an opposite side over its neutral position, i.e., a so-called "swingback" occurs. Therefore, in order to prevent this, processing from step C39 is performed.

In step C39, whether the swingback flag SWB is set is judged. In this case, the swingback flag SWB is not set because the flow advances to step C39 for the first time. Therefore, "NO" is judged in step C39, and the swingback flag SWB is set and swingback timer TY is set to be "0" (steps C40 and C41). If acceleration G stored in memory Mg is judged to be left (right turn), front and rear right solenoid valves 23 and 27 are turned off. If acceleration G is judged to be right (left turn), front and rear left solenoid valves 22 and 26 are turned off. As a result, chambers 3 of the left and right suspension units communicate with each other (steps C42 to C44). Therefore, since chambers 3 of the left and right suspension units communicate earlier, a swingback of the vehicle body is prevented from being increased by a pressure difference between left and right chambers 3. Front and rear supply valves 20 and 24 are turned off, exhaust direction chamber valves 28 and 32 are turned off, the pressure difference hold flag is reset, control level CL=0 is set, the control flag is reset, and then the flow returns to the processing in step C1 (steps C45 to C49). If "YES" is judged in steps C37 and C38 and the flow advances to step C39, the flow advances to a swingback routine from step C50 because the swingback flag SWB is already set.

That is, the count of timer TY is incremented, and whether the count of timer TY is 0.25 sec or more is judged (steps C50 and C51). If "NO" is judged in step C51, the flow returns to the processing in step C1. Thereafter, the processing from step C1 is performed, and when timer TY is incremented and the count of timer TY becomes 0.25 sec or more, whether the count of timer TY is 2.25 sec or more is judged (step C52). Therefore, if the count of timer TY is 0.25 sec or more and less than 0.225 sec, "NO" is judged in step C52, and the flow advances to processing from step C53. If acceleration G in the left-and-right direction is judged and the direction of memory Mg is judged to be right in step C53, front and rear left solenoid valves 22 and 26 are turned on. If accelerated degree G in the left-and-right direction is judged to be left, front and rear right solenoid valves 23 and 27 are turned on. In addition, exhaust direction change valves 28 and 32 are turned on (steps C53 to C56). A spring constant of the front and rear suspension units can be increased by processing in step C54. In this manner, when steering angular velocity $\dot{\theta}H$ becomes the threshold value $\dot{\theta}HM$ or more in FIG. 6 and change over time in acceleration G in the left-and-right direction at the returning side becomes 0.6 g/sec or more, air spring chambers 3 are immediately caused to communicate each other. As a result, a swingback of the vehicle body is prevented from being increased by a pressure difference between left and right chambers 3 produced by roll control. Then, 0.25 second after the chambers communicate, communication is disconnected for only two seconds. Therefore, the spring constant in each chamber 3 is increased when the vehicle body returns to its neutral state, thereby reducing a roll of the vehicle body to an opposite side. When 2.25 seconds have passed, "YES" is judged in step C52 and the swingback flag is reset, thereby completing the swingback processing (step C57). Thereafter, the processing from step C42 is performed, and then the processing from step C1 is performed.

If "NO" is judged in step C37 or C38, i.e., if the in acceleration $\dot{G}$ is small when the vehicle return from turning to straight travel, the above swingback control is not suitable. Therefore, the following control is performed. That is, whether the swingback flag SWB is set is judged (step C58). If the swingback flag SWB is set, the flow advances to processing from step C50. This situation may actually occur in the swingback control process.

Since the swingback flag SWB is not set when the vehicle slowly returns from turning to straight travel, "NO" is judged in step C58. Then, whether acceleration G in the left-and-right direction is at a non sensitive area level, i.e., "G≦G0" is judged (step C59). If G is at the non sensitive area level, whether a pressure difference holds is determined (step C60). If the pressure difference holds, the flow advances to processing from step C61 so that the pressure difference between left and right chambers 3 is gradually released by duty control.

Processing of a duty control routine performed from step C61 will be described below. First, whether duty control number Tn is three or more is judged (step C61). Then, whether duty timer TD is Tmn or more is judged (step C62). In this case, "YES" is judged because both TD and Tmn are "0" at first. However, if "NO" is judged in step C62, duty timer TD is incremented (step C63), and processing for increasing a damping force of shock absorber 1 harder by one step is performed in steps C64 to C67. Although not shown, a step is provided between steps C63 and C64, for returning the flow after the damping force of absorber 1 is set in step C66 or C67 in a cycle of control for releasing the pressure difference between left and right chambers 3 and processing in step C63 is completed.

If "YES" is judged in step C62, i.e., if duty timer TD becomes Tmn, the flow advances to processing from step C68 so that processing of causing left and right chambers 3 to intermittently communicate with each other is started. First, direction Mg of acceleration G in the left-and-right direction stored in step C31 is judged (step C68). If the direction of acceleration G in the left-and-right direction is judged to be left, whether front and rear right solenoid valves 23 and 27 are turned off is judged in step C69. Since valves 23 and 27 are initially turned on (i.e., a pressure difference holds), they are turned off in step C71. Therefore, left and right chambers 3 communicate with each other, and air in left chambers 3 flows into right chambers 3. Then, in steps C72 and C73, duty counter Tn is incremented, "Tmn+Tm" (Tm is a constant about 0.1 second) is set in duty timer Tmn, and the flow returns to the processing in step C1. Then, after Tm seconds have passed, "YES" is judged in step C62, "left" is judged in step C68, and the flow advances to step C69. "YES" is judged in step C69 because right solenoid valves 23 and 27 are already turned off, and the flow advances to step C70 to turn on solenoid valves 23 and 27. Then, the flow advances to step C73 to set "Tmn+Tm" in duty timer Tmn. In this manner, when processing of opening valves 23 and 27 for Tm seconds is repeated three times, i.e., when left and right chambers 3 communicate with each other three times, "YES" is judged in step C61. Then, in steps C74, C75, C76, and C82, front and rear exhaust direction change valves 28 and 32 are turned off, the pressure difference hold flag is reset, control level CL=0 is set, and a duty control sequence is completed.

When the "right side" is judged in step C68, processing as in steps C69 to C71 is performed for left solenoid valves 22 and 26. After this processing is performed three times, the flow advances to processing in step C74, thereby completing a processing sequence.

As described above, when the steering wheel is returned slowly while the vehicle returns from turning to straight travel or change over time G in acceleration G is small, a pressure difference between left and right air spring chambers 3 is gradually reduced by the duty control sequence. Therefore, each chamber 3 can return to the state before control very smoothly.

Figure 16A:
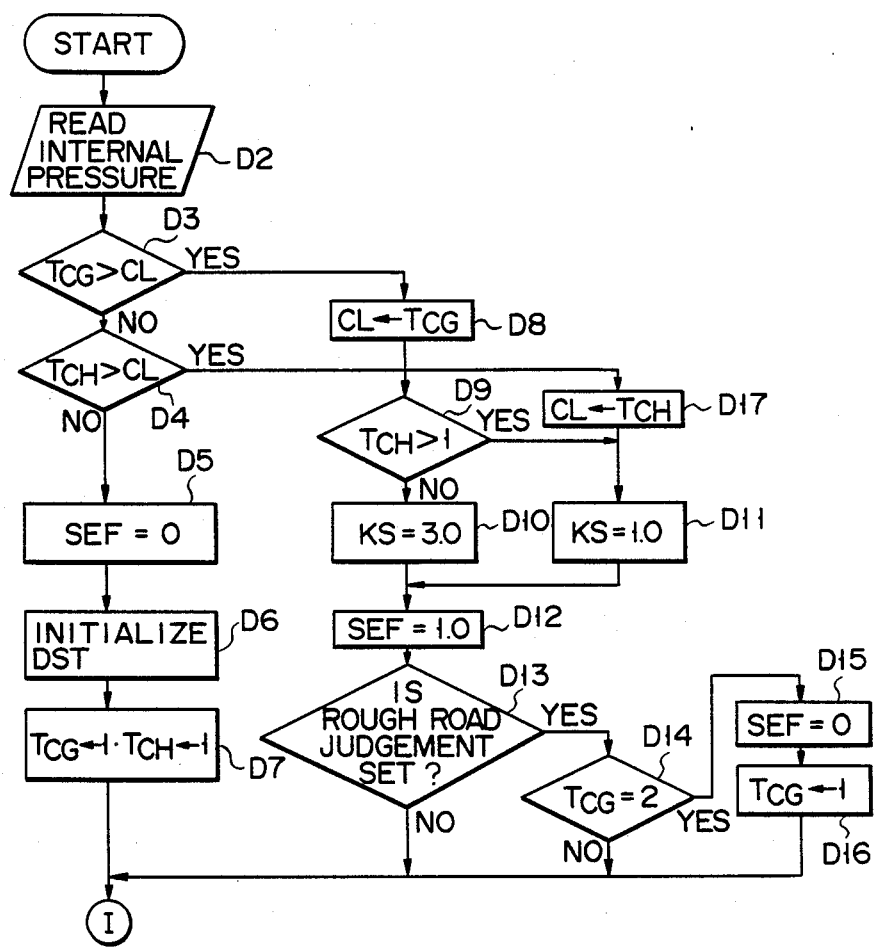
FIGS. 16A and 16B are detailed flow charts for explaining an inlet/outlet time adjusting routine.
Figure 16B:
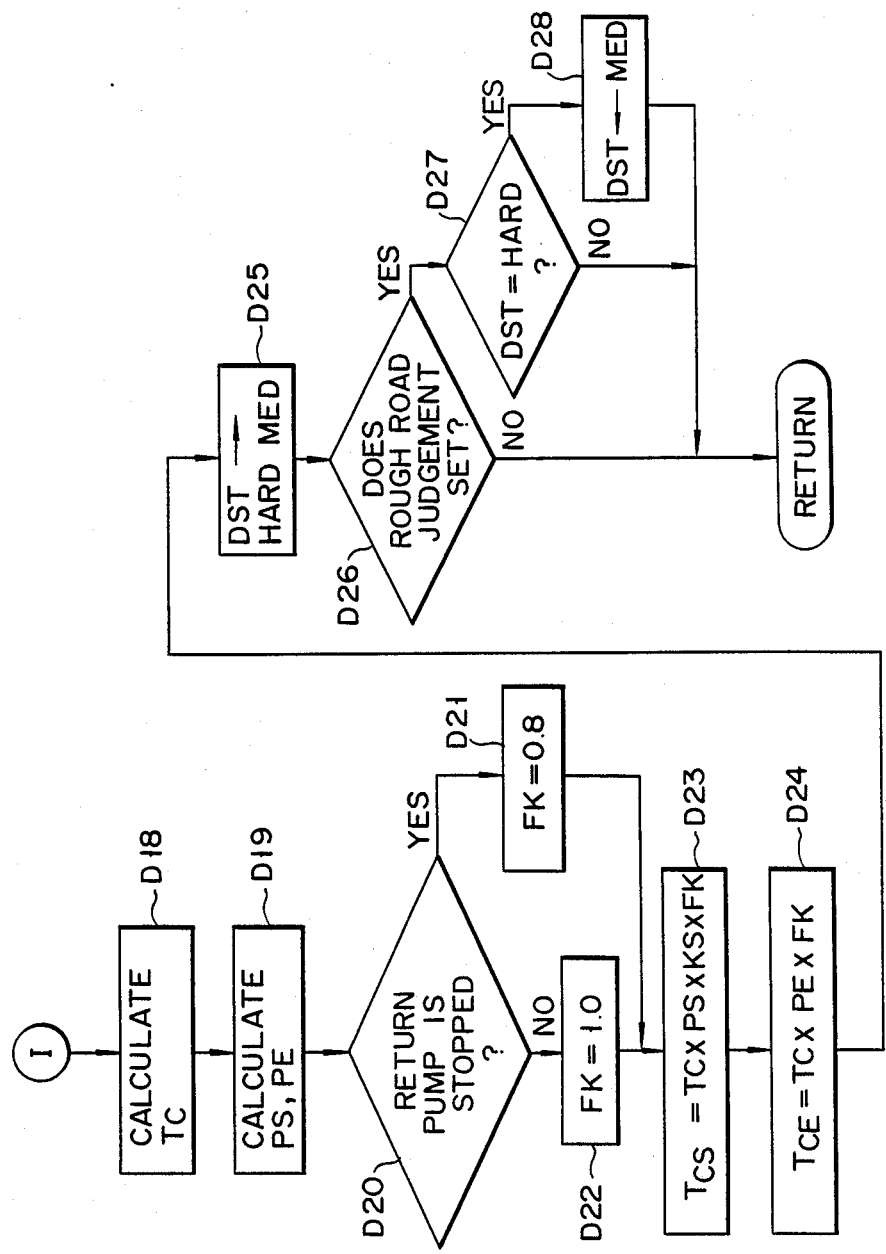

The inlet/outlet time adjusting routine in step A3 will be described with reference to FIGS. 16A and 16B. First, internal pressures in rear suspension units RS1 and RS2 are detected by a signal from pressure sensor 45 (step D2). Then, control level TCG calculated from the G sensor map in FIG. 8 or control level TCH calculated from one of the steering angular velocity - vehicle velocity maps in FIGS. 5 to 7 is compared with control level CL (steps D3 and D4). If control level TCG or TCH is larger than control level CL, this level is stored in control level CL (steps D8 and D17). Note that "0" is set in control level register CL as an initial level.

Meanwhile, if both of control levels TCG and TCH are judged to be smaller than control level CL, inlet/outlet flag SEF is reset, a damping force change position is reset, and non sensitive area level "1"s are set in control levels TCG and TCH (steps D5 to D7).

If "TCH<1" (i.e., a lateral acceleration acting on a vehicle body is small) after control level TCG is set in control level CL in step D8, "3" is set in supply coefficient Ks (step D10). If "TCH>1" (i.e., the lateral acceleration acting on the vehicle body is large), "1" is set in supply coefficient Ks (step D11). If control level TCH is set in control level CL in step D17, "1" is set in supply coefficient Ks (step D11).

Flag SEF representing that supply/exhaust control must be performed is set (step D12) after step D10 or D11, and air is supplied/exhausted in accordance with the roll control routine in FIGS. 15A-I to 15B-II. Then, whether a rough road judgement set in the rough road judging routine in FIG. 12 is set is judged (step D13). If it is judged in step D13 that the rough road judgement is set, whether control level TCG is "2" is judged (step D14). If the control level is "2", flag SEF is reset, and non sensitive area level "1" is set in control level TCG (steps D15 and D16). That is, as shown in FIG. 13, when control level TCG is "2" in the rough road judgement, an inlet/outlet time is determined to be "0" and roll control is not performed although it is normally performed for an inlet/outlet time of 150 ms. That is, when the rough road judgement is set as in rough road travel, an erroneous operation of roll control on a rough road is prevented by widening the non sensitive area of the G sensor.

Figure 17:
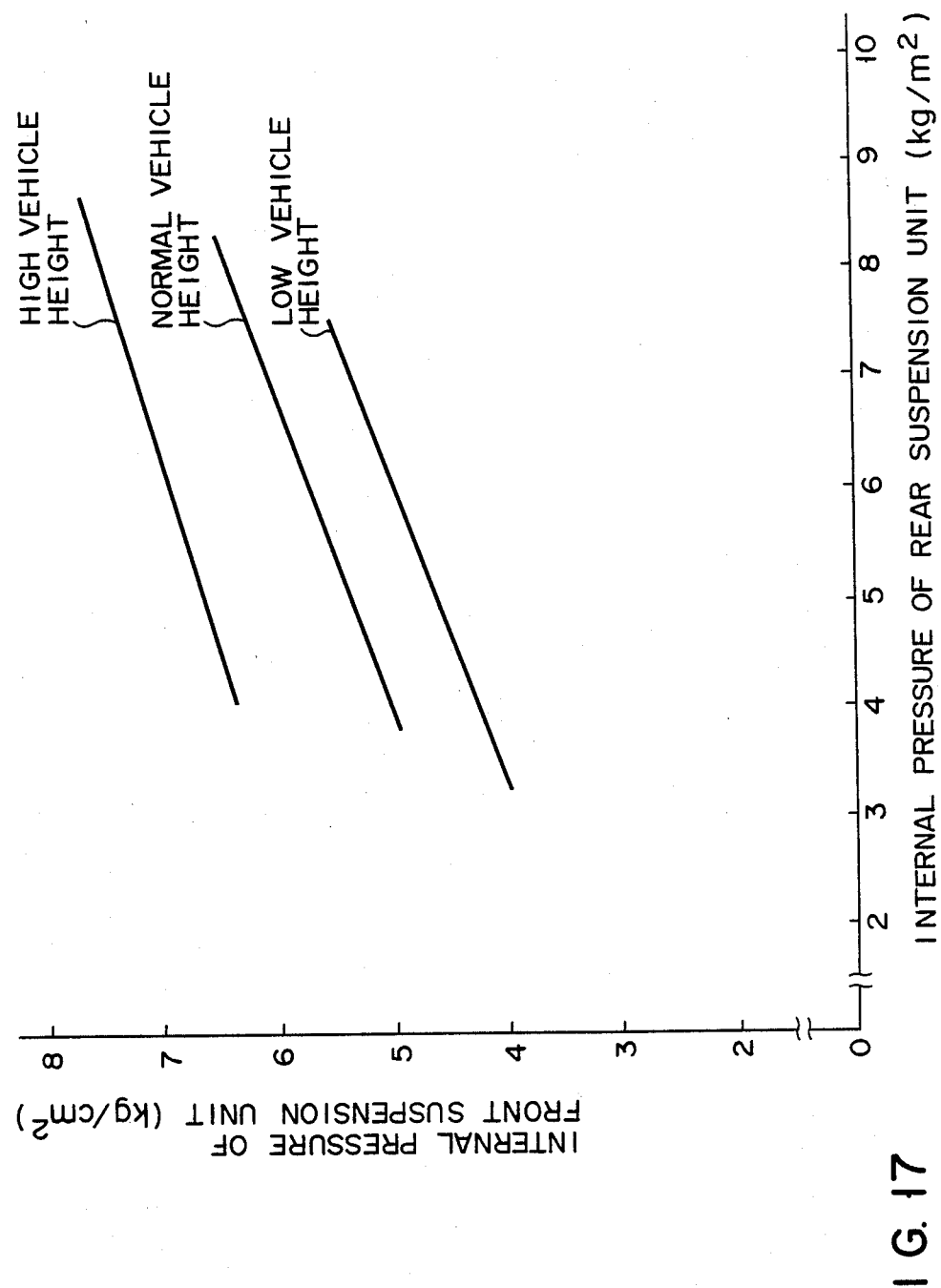
FIG. 17 is a graph showing a relationship between an internal pressure of a rear suspension unit and an internal pressure of a front suspension unit.
Figure 18:
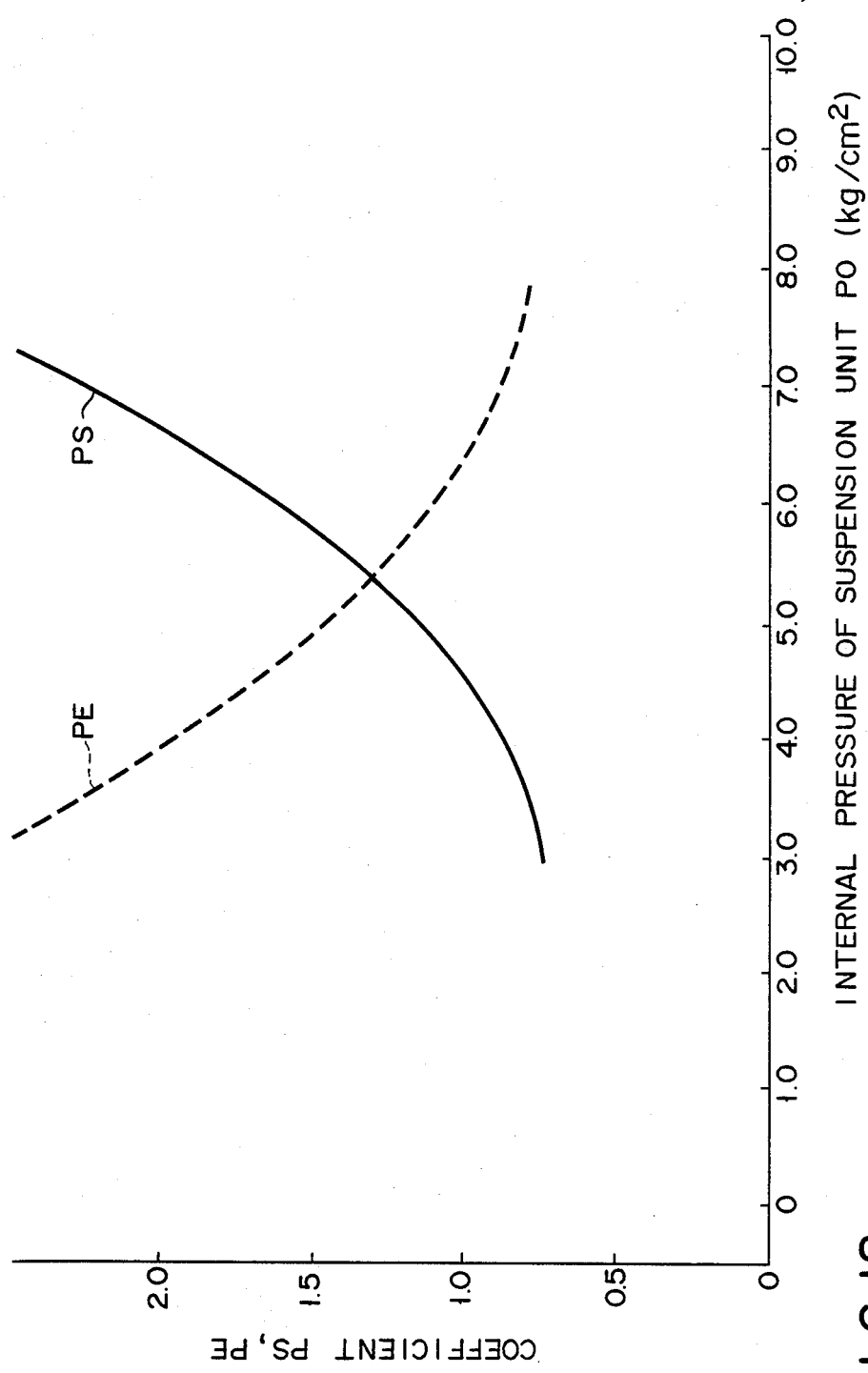
FIG. 18 is a graph showing a relationship between internal pressure of suspension unit $P_0$ and coefficient PS, PE.

When processing in steps D7, D13, D14, and D16 is completed, inlet/outlet reference time Tc corresponding to calculated control levels TCH and TCG with reference to FIG. 9 or 10 (step D18). Then, internal pressures (rear internal pressures) of rear suspension units RS1 and RS2 are detected by pressure sensor 45, and front internal pressures are estimated in accordance with the rear internal pressures with reference to the front internal pressure - rear internal pressure graph of FIG. 17. The front internal pressure - rear internal pressure graph will be described in more detail. That is, if the case wherein one passenger sits in a front seat and two passengers sit in a rear seat is compared with the case wherein two passengers sit in a front seat and one passenger sits in a rear seat, strictly speaking, this graph does not apply. However, it is confirmed by experiments that a value closer to an actual front internal pressure can be calculated from a rear internal pressure by forming graphs corresponding to all possible passenger patterns. In the graph in FIG. 17, three characteristics of high, normal, and low vehicle heights are shown. This is because a relationship between the rear and front interval pressures differs in the high, normal, and low vehicle heights. It is a matter of course that the graph is utilized in accordance with a vehicle height. In this manner, front/rear inlet adjusting coefficient PS and front/rear outlet adjusting coefficient PE are calculated with reference to the inlet/outlet time adjusting coefficient graph in FIG. 18 (step D19). In FIG. 18, if the internal pressure of the suspension unit is high, a time required for supplying the same amount of air is increased longer than that required when the internal pressure of the suspension unit is low. Therefore, adjusting coefficient PS is proportional to internal pressure $P_0$. When the internal pressure of the suspension unit is high, a time required for exhausting the same amount of air is reduced shorter than that required when the internal pressure is low. Therefore, adjusting coefficient PE is inversely proportional to internal pressure $P_0$.

Then, whether compressor 16 (return pump) is stopped is judged (step D20). If compressor 16 is stopped, i.e., a pressure difference between high-pressure reserve tank 15a and low-pressure reserve tank 15b is large, an air flow amount is larger even when an inlet/outlet time of the suspension unit is short. Therefore, initial FK=0.8 is set (step D21). If compressor 16 is not stopped, i.e., the pressure difference between tanks 15a and 15b is small, initial coefficient FK=1 is set and the inlet/outlet time is not adjusted (step D22).

Then, inlet reference time Tc which is already calculated is multiplied with inlet time adjusting coefficient PS, inlet coefficient KS, and initial coefficient FK, thereby obtaining adjusted inlet time TCS (step D23). In addition, outlet reference time Tc which is already calculated is multiplied with outlet adjusting coefficient PE and initial coefficient FK, thereby obtaining adjusted outlet time TCE (step D24). Note that inlet and outlet times TCS and TCE can be independently calculated because they have different adjusting coefficients at the front and rear sides.

Then, a damping force change position corresponding to control levels TCG and TCH is obtained with reference to FIGS. 9 and 10 and set in damping force target value DST (step D25). If the rough road judgement is set and value DST is HARD, it is changed to MEDIUM (steps D26 to D28: these steps correspond to a damping force control means). As a result, a tracking property of a wheel with respect to a road surface is improved during rough road travel.

The damping force change routine (step A4) will be described below with reference to FIGS. 19 and 20.

First, whether damping force target value DST which is calculated with reference to FIG. 9 or 10 on the basis of control level TCH or TCG is larger than manually-set damping force value MDST is judged (step E1). If value DST is larger than value MDST, a damping force is changed so that damping force current value DDST becomes equal to damping force target value DST and timer TDS is reset (steps E2 to E4). Note that value MDST is set at "SOFT" in the SOFT mode and the AUTO mode and is set at "HARD" in the SPORT mode. When value DDST becomes equal to value DST, timer TDS is counted until timer TDS counts two seconds (steps E5 and E6). When timer TDS counts two seconds, it is reset (step E7). Then, if the pressure difference does not hold, manually-set value MDST is restored (step E9).

If it is judged in step E8 that the pressure difference holds, i.e., roll control holds, processing of reducing the damping force by one level is performed in steps E10 to E12. That is, when value DDST is HARD, the damping force is set at MEDIUM. When value DDST is not HARD, the damping force is set at SOFT. Note that a step (not shown) of returning the flow not through steps E10, E11, and E12 when "YES" is judged in step E8 after the damping force is changed in step E11 or E12 during a series of pressure difference holding intervals is provided between steps E8 and E10.

Figures 19, 20:
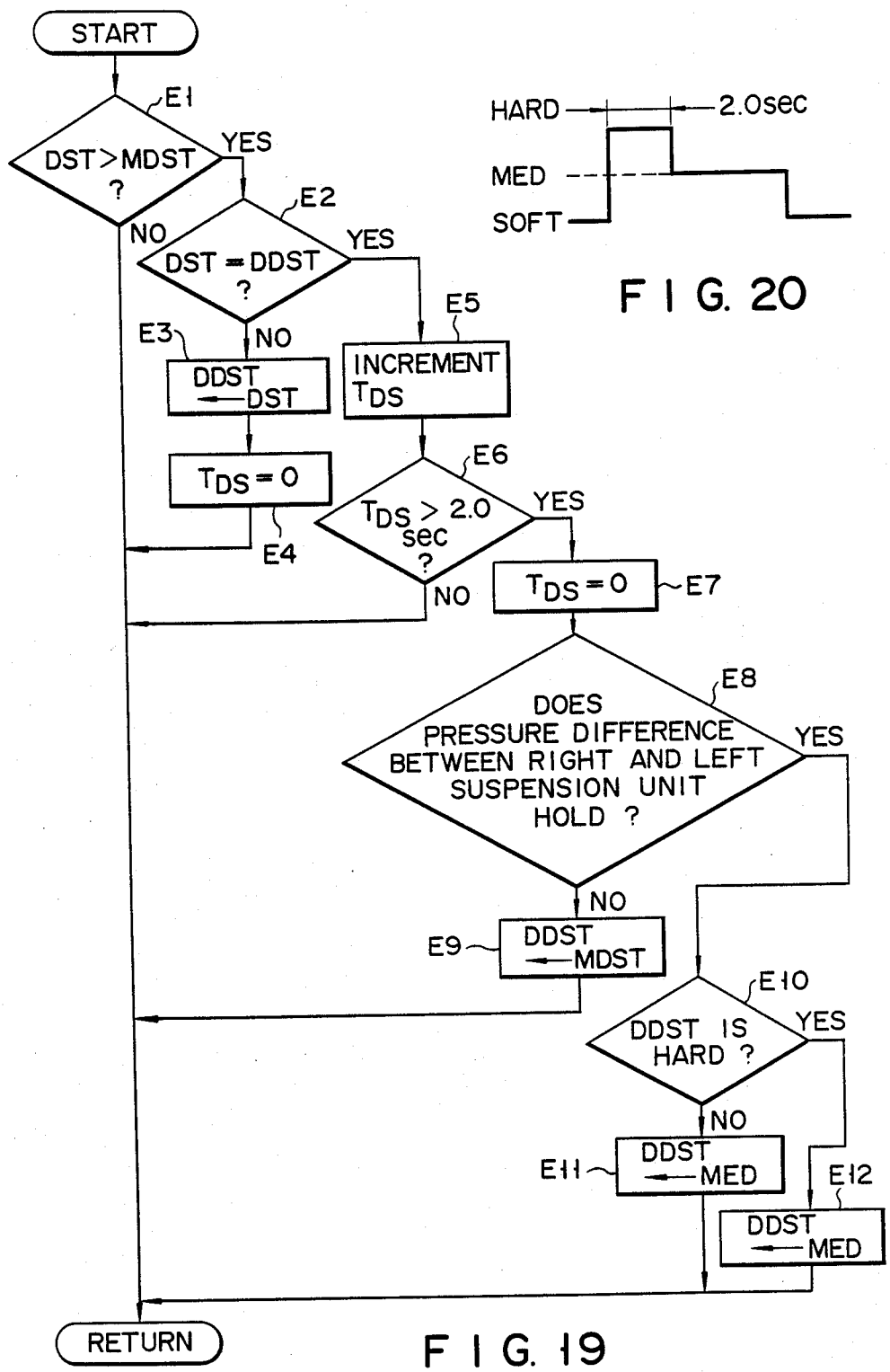
FIG. 19 is a detailed flow chart for explaining a damping force changing routine.
FIG. 20 is a view showing a change over time of a damping force.

In this manner, when damping force target value DST calculated on the basis of the control level is set higher than manually-set damping force MDST, the damping force is set higher for two seconds and then reduced by one level while roll control holds as shown in FIG. 20. Therefore, regardless of the manually-set damping force, the damping force of shock absorber 1 is properly increased when roll stiffness is mostly required for the suspension unit during roll control. Therefore, roll control is performed more effectively in an initial stage of a vehicle turn. In addition, since the damping force of absorber 1 is lowered by one level while a pressure difference holds, a driving feeling is not so much degraded. After pressure difference holding is released, the damping force is automatically returned to a manually-set damping force corresponding to a driver's taste. Therefore, the driver need not manually return the damping force each time the pressure difference holding is released.

The above embodiment is described with reference to an air pressure type suspension apparatus. However, the present invention can be similarly applied to apparatuses of other types, e.g., a hydropneumatic type suspension apparatus. In the above embodiment, the maps shown in FIGS. 5 to 8 are used as a roll amount detecting means. However, according to the present invention, the roll amount may be detected on the basis of a vehicle velocity and a steering angle.

According to the present invention, an inlet/outlet time is obtained from the detected roll amount, and inlet/outlet control of chamber 3 is performed on the basis of the inlet/outlet time. However, the present invention can be similarly applied to a suspension apparatus in which a pressure sensor for detecting a pressure in each fluid spring chamber is used and a fluid is supplied to/exhausted from the fluid spring chamber by a servo valve for performing feedback control on the basis of a given control target and a value detected by the pressure sensor.

What is claimed is:

1. A vehicle suspension apparatus having a fluid spring chamber provided for each wheel and inserted between the wheel and a vehicle body, fluid supply means for supplying a fluid to said fluid spring chambers through supply valve means, fluid exhaust means for exhausting the fluid from said fluid spring chambers through exhaust valve means, roll amount detecting means for detecting a roll amount of the vehicle body, and roll control means for setting a control target corresponding to the roll amount detected by said roll amount detecting means and executing roll control in which said supply valve means corresponding to said fluid spring chambers at a contracting side with respect to a direction of roll generated in said vehicle body and said exhaust valve means corresponding to said fluid spring chambers at an expanding side are opened in accordance with the control target, comprising:

a plurality of memory means, provided in said roll control means, each for storing a control target corresponding to the roll amount of said vehicle body, the control targets stored in said plurality of memory means being different from each other; and selection switch means for outputting a selection signal for selecting one of said plurality of memory means in said roll control means to said roll control means, wherein said roll control means calculates a control target in accordance with one of said memory means selected by said selection switch means on the basis of the roll amount detected by said roll amount detecting means and executes the roll control on the basis of the obtained control target.

2. An apparatus according to claim 1, wherein said roll amount detecting means has vehicle velocity detecting means for detecting a vehicle velocity and steering angular velocity detecting means for detecting a steering angular velocity, and a plurality of control targets are set in each of said plurality of memory means in accordance with values of the vehicle velocity and the steering angular velocity.

3. An apparatus according to claim 1, wherein said roll amount detecting means has vehicle velocity detecting means for detecting a vehicle velocity and acceleration detecting means for detecting a lateral acceleration acting on said vehicle body, and a plurality of control targets are set in each of said plurality of memory means in accordance with values of the vehicle velocity and the lateral acceleration.

4. An apparatus according to claim 1, further comprising:

a damping force variable type shock absorber provided for each wheel and inserted between the wheel and said vehicle velocity;

target damping force setting means for setting a target damping force in accordance with a control target obtained by said roll control means; and shock absorber control means for changing the damping force of said shock absorber in accordance with the target damping force set by said target damping force setting means.

5. An apparatus according to claim 1, wherein in roll control, said roll control means calculates a control time on the basis of the control target and opens said supply valve means corresponding to said fluid spring chambers at a contracting side with respect to a direction of roll generated in said vehicle body and said exhaust valve means corresponding to said fluid spring chambers at an expanding side for only the calculated control time.

* * * * *

UNITED STATES PATENT AND TRADEMARK OFFICE
CERTIFICATE OF CORRECTION

PATENT NO. : 4,830,394

DATED : May 16, 1989

INVENTOR(S) : Tadao Tanaka et al

It is certified that error appears in the above-identified patent and that said Letters Patent is hereby corrected as shown below:

Figure 9, right hand column beneath the term "damping force" cancel "soft" and insert -- hard --.

Figure 10, left hand column, cancel "TCH" and insert -- TCG -- (per attached sheets)

Signed and Sealed this

Third Day of September, 1991

Attest:

HARRY F. MANBECK, JR.

Attesting Officer

Commissioner of Patents and Trademarks

| ROLL CONTROL MODE / CONTROL LEVEL TCH | SOFT MODE | | AUTO MODE | | SPORT MODE | |
|---|---|---|---|---|---|---|
| | TCS, TCE | DAMPING FORCE | TCS, TCE | DAMPING FORCE | TCS, TCE | DAMPING FORCE |
| 1 | NON SENSITIVE AREA | SOFT | NON SENSITIVE AREA | SOFT | NON SENSITIVE AREA | HARD |
| 2 | ↑ | ↑ | DISCOMMUNI-CATION | MEDIUM | 200 msec | ↑ |
| 3 | ↑ | ↑ | 150 msec | ↑ | 300 msec | ↑ |
| 4 | ↑ | ↑ | 200 msec | HARD | 400 msec | ↑ |
| 5 | 200 msec | HARD | 300 msec | HARD | 500 msec | ↑ |
| 6 FRONT | | | | | 500 msec | ↑ |
| 6 REAR | | | | | 650 msec | ↑ |

F I G. 9

| ROLL CONTROL MODE / CONTROL LEVEL TCG | AUTO (V<130km/h) | | AUTO (V≧130km/h) | | SPORT | |
|---|---|---|---|---|---|---|
| | TCS, TCE | DAMPING FORCE | TCS, TCE | DAMPING FORCE | TCS, TCE | DAMPING FORCE |
| 1 | NON SENSITIVE AREA | SOFT | NON SENSITIVE AREA | MEDIUM | NON SENSITIVE AREA | HARD |
| 2 | ← | ← | 100msec | ← | 150msec | ← |
| 3 | ← | ← | 250msec | ← | 300msec | ← |
| 4 | DISCOMMUNI-CATION | MEDIUM | 450msec | HARD | 500msec | ← |
| 5 | 150msec | ← | | | | |
| 6 | 350msec | HARD | | | | |

F I G. 10

UNITED STATES PATENT AND TRADEMARK OFFICE
CERTIFICATE OF CORRECTION

PATENT NO. : 4,830,394

DATED : May 16, 1989

INVENTOR(S) : Tadao Tanaka et al.

It is certified that error appears in the above-identified patent and that said Letters Patent is hereby corrected as shown below:

Column 4, line 63, delete "1 MHz" insert -- M Hz --.

Figure 19 should be deleted to appear as per attached sheet.

Signed and Sealed this

Twenty-first Day of July, 1992

Attest:

DOUGLAS B. COMER

*Attesting Officer*      *Acting Commissioner of Patents and Trademarks*

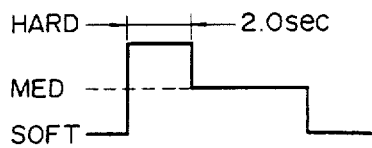
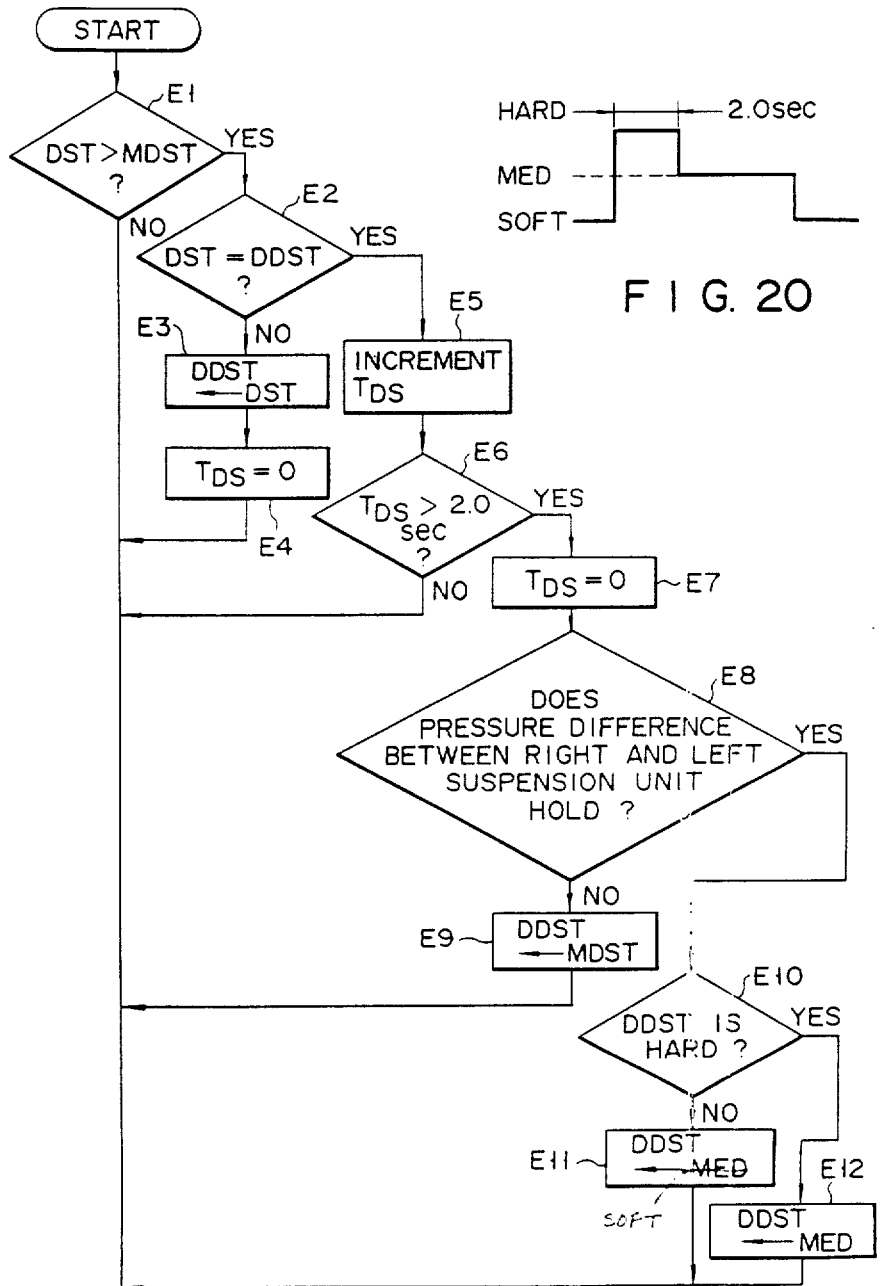
FIG. 20
FIG. 19